(12) United States Patent
Boduch et al.

(10) Patent No.: US 9,788,088 B2
(45) Date of Patent: Oct. 10, 2017

(54) METHOD AND APPARATUS FOR OPTICAL NODE CONSTRUCTION USING FIELD PROGRAMMABLE PHOTONICS

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

(*) Notice: Subject to any disclaimer, the term of this patent is extended or adjusted under 35 U.S.C. 154(b) by 0 days.

(21) Appl. No.: 14/485,970

(22) Filed: Sep. 15, 2014

(65) Prior Publication Data

US 2015/0086203 A1 Mar. 26, 2015

Related U.S. Application Data

(60) Provisional application No. 61/880,860, filed on Sep. 21, 2013.

(51) Int. Cl.
*H04J 14/02* (2006.01)
*H04B 10/294* (2013.01)
*H04Q 11/00* (2006.01)

(52) U.S. Cl.
CPC ..... *H04Q 11/0005* (2013.01); *H04B 10/2941* (2013.01); *H04J 14/0204* (2013.01); *H04J 14/0212* (2013.01); *H04J 14/0217* (2013.01); *H04J 14/0221* (2013.01); *H04Q 2011/0013* (2013.01); *H04Q 2011/0016* (2013.01); *H04Q 2011/0035* (2013.01); *H04Q 2011/0052* (2013.01)

(58) Field of Classification Search
CPC .............. H04J 14/0212; H04J 14/0217; H04J 14/0201–14/022; H04Q 2011/0015–2011/0016; H04Q 2011/0052; H04Q 11/0005; H04Q 11/0062; H04Q 2011/0035

See application file for complete search history.

(56) References Cited

U.S. PATENT DOCUMENTS

| | | | | |
|---|---|---|---|---|
| 6,169,616 | B1* | 1/2001 | Cao | H04J 14/0208 398/9 |
| 7,231,147 | B1* | 6/2007 | Goldstein | G02B 6/356 385/17 |
| 9,008,514 | B2 | 4/2015 | Boduch et al. | |
| 9,276,695 | B2 | 3/2016 | Boduch et al. | |
| 9,374,186 | B1 | 6/2016 | Boduch et al. | |
| 2002/0131116 | A1* | 9/2002 | Shimomura | H04B 10/03 398/83 |
| 2004/0161234 | A1* | 8/2004 | Ozawa | H04B 10/077 398/33 |
| 2009/0232497 | A1* | 9/2009 | Archambault | H04J 14/0206 398/50 |
| 2011/0293272 | A1* | 12/2011 | Graves | H04Q 11/0005 398/45 |
| 2015/0055952 | A1* | 2/2015 | Younce | H04J 14/0212 398/48 |

* cited by examiner

*Primary Examiner* — David Payne
*Assistant Examiner* — Casey Kretzer

(57) ABSTRACT

Example embodiments of the present invention relate to an optical signal processor comprising of at least one wavelength processing device, a plurality of optical amplifying devices, and a least one field programmable photonic device.

10 Claims, 13 Drawing Sheets

METHOD AND APPARATUS FOR OPTICAL NODE CONSTRUCTION USING FIELD PROGRAMMABLE PHOTONICS

RELATED APPLICATION

This application claims the benefit of: U.S. Provisional Application No. 61/880,860, filed on Sep. 21, 2013.

The entire teachings of the above application are incorporated herein by reference.

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded by the networks closest to the end customers. This new breed of optical processing equipment will require new levels of optical signal processing integration.

SUMMARY

A method and corresponding apparatus in an example embodiment of the present invention relates to providing a means of quickly creating specific-function optical nodes using field programmable photonics (FPP). The example embodiments include a light processing apparatus utilizing field programmable photonics and field programmable photonic devices, whose level of equipment redundancy matches the economics associated with the location of the apparatus within provider networks. Additionally, the example embodiments include a light processing apparatus utilizing application specific photonics and application specific photonic devices.

An optical signal processor is presented. The optical signal processor comprises: at least one wavelength equalizing array, a plurality of optical amplifying devices, and at least one field programmable photonic device. Within the optical signal processor, the plurality of optical amplifiers may comprise an optical amplifier array. Additionally, within the optical signal processor, the field programmable photonic device may comprise a plurality of optical coupler devices that are interconnected with optical switches. The optical coupler devices and the optical switches may be integrated together on a substrate. Additionally, the field the plurality of optical coupler devices may be interconnected to input and output ports with optical switches.

An optical node is presented. The optical node comprises: at least one wavelength equalizing array, a plurality of optical amplifying devices, and at least one field programmable photonic device. The optical node may comprise at least two optical degrees. The at least one wavelength equalizing array may be used to select wavelengths for the at least two optical degrees, and to perform directionless steering for the add/drop ports. Alternatively, the optical node may comprise at least three optical degrees. Alternatively, the optical node may comprise at least four optical degrees. The optical node may further comprise a plurality of directionless add/drop ports.

A ROADM circuit pack is presented. The ROADM circuit pack comprises: at least one wavelength equalizing array, a plurality of optical amplifying devices, and at least one field programmable photonic device.

An optical signal processor is presented. The optical signal processor comprises: at least one wavelength equalizing array, a plurality of optical amplifying devices, and at least one application specific photonic device. The application specific photonic device comprises a plurality of optical coupler devices. The plurality of optical coupler devices are integrated together on a substrate. The optical signal processor may comprise at least two optical degrees. Alternatively, the optical signal processor may comprise at least three optical degrees. Alternatively, the optical signal processor may comprise at least four optical degrees. The optical signal processor may further comprise a plurality of directionless add/drop ports.

A method of performing optical signal processing is presented. The method comprises: filtering individual wavelengths utilizing at least one wavelength equalizing array, amplifying groups of wavelengths using a plurality of optical amplifying devices, and performing multiple networking applications using a field programmable photonic device.

A method of performing functions of a multi-degree optical node is presented. The method comprises filtering individual wavelengths utilizing at least one wavelength equalizing array, amplifying groups of wavelengths using a plurality of optical amplifying devices, and programming a field programmable photonic device to create optical nodes of differing capabilities.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
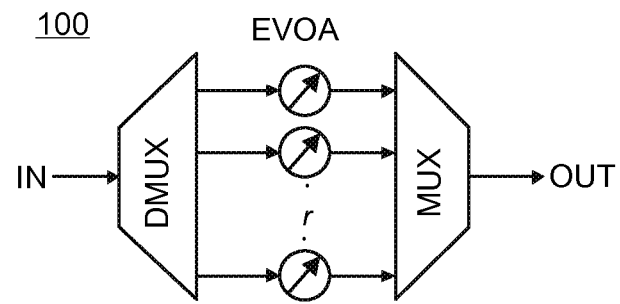
FIG. 1 is an illustration of a wavelength equalizer.

FIG. 1 is an illustration of a wavelength equalizer 100 consisting of; a wavelength de-multiplexer (DMUX) that is used to separate a composite Wavelength Division Multiplexed (WDM) signal into r number of individual wavelengths, a plurality of Electrical Variable Optical Attenuators (EVOAs) used to partially or fully attenuate the individual wavelengths, and a wavelength multiplexer (MUX) that is used to combine r number of individual wavelengths into a composite Wavelength Division Multiplexed (WDM) signal. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

Figure 2:
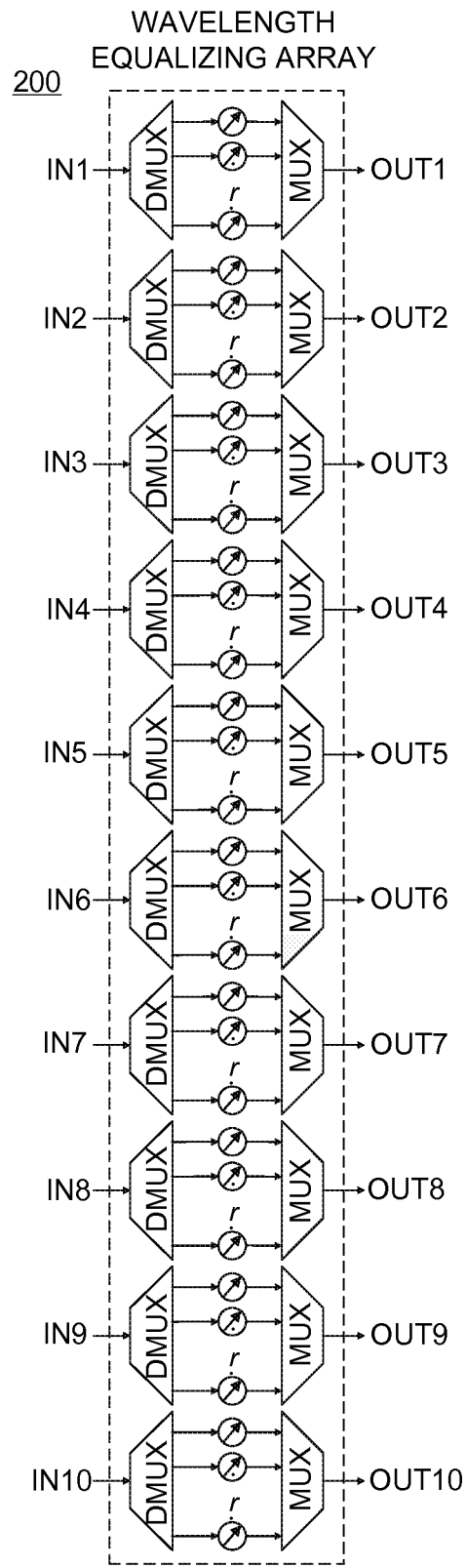
FIG. 2 is an illustration of a wavelength equalizing array containing ten wavelength equalizers.

FIG. 2 is an illustration of a wavelength equalizing array 200 contained within a single device. The wavelength equalizing array contains ten wavelength equalizers that may be of the type 100 illustrated in FIG. 1.

The wavelength equalizing array 200 contains ten optical inputs (IN1-IN10) that are attached to the inputs of the wavelength equalizers, and ten optical outputs (OUT1-OUT10) that are attached to the outputs of the wavelength equalizers. The electronic circuitry (not shown) used to control the EVOAs may reside within the wavelength equalizing array device, or may reside external to the wavelength equalizing array device.

Figure 3:
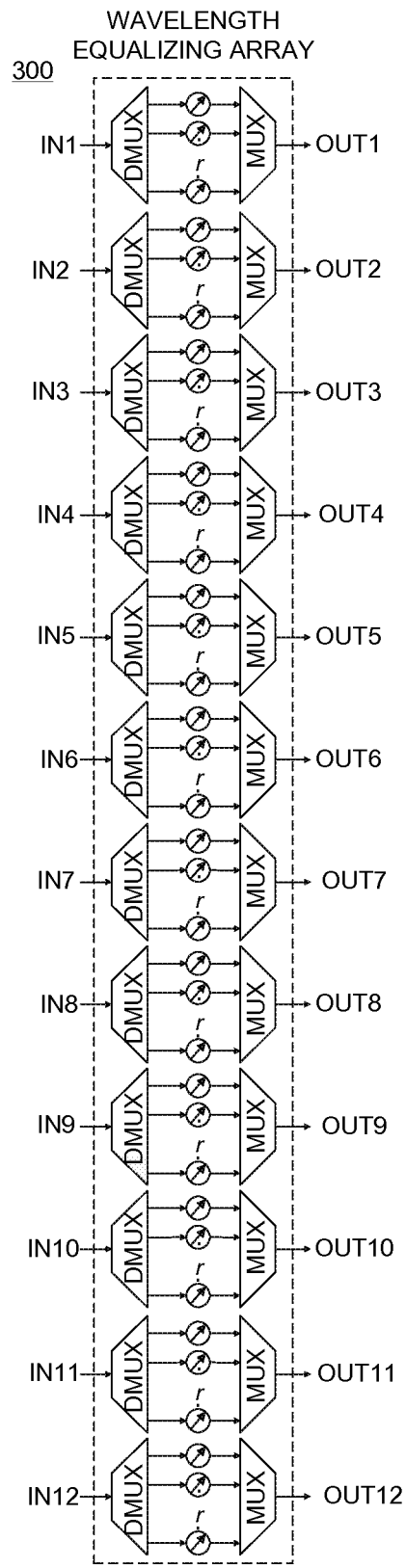
FIG. 3 is an illustration of a wavelength equalizing array containing twelve wavelength equalizers.

FIG. 3 is an illustration of a wavelength equalizing array 300 containing twelve wavelength equalizers that may be of the type 100 illustrated in FIG. 1. The array may be contained within a single device.

Although wavelength equalizing arrays 200 and 300 illustrate arrays with ten and twelve wavelength equalizers respectively, in general there is no limit to the number of wavelength equalizers that can be placed within a single device. Therefore, arrays with sixteen, twenty-four, or thirty-two wavelength equalizers may be possible.

Multiple different technologies may be used to implement the wavelength equalizing arrays 200 and 300, including Planer Lightwave Circuit (PLC) technology and various free-space optical technologies such as Liquid Crystal on Silicon (LCOS). The Wavelength Processing Array (WPA-12) from Santec Corporation is an example of a commercially available wavelength equalizing array containing twelve wavelength equalizers. The wavelength equalizing arrays 200 and 300 may be implemented by placing PLC based EVOAs and multiplexers (Arrayed Waveguide Gratings (AWG)) on a single substrate.

Figure 4:
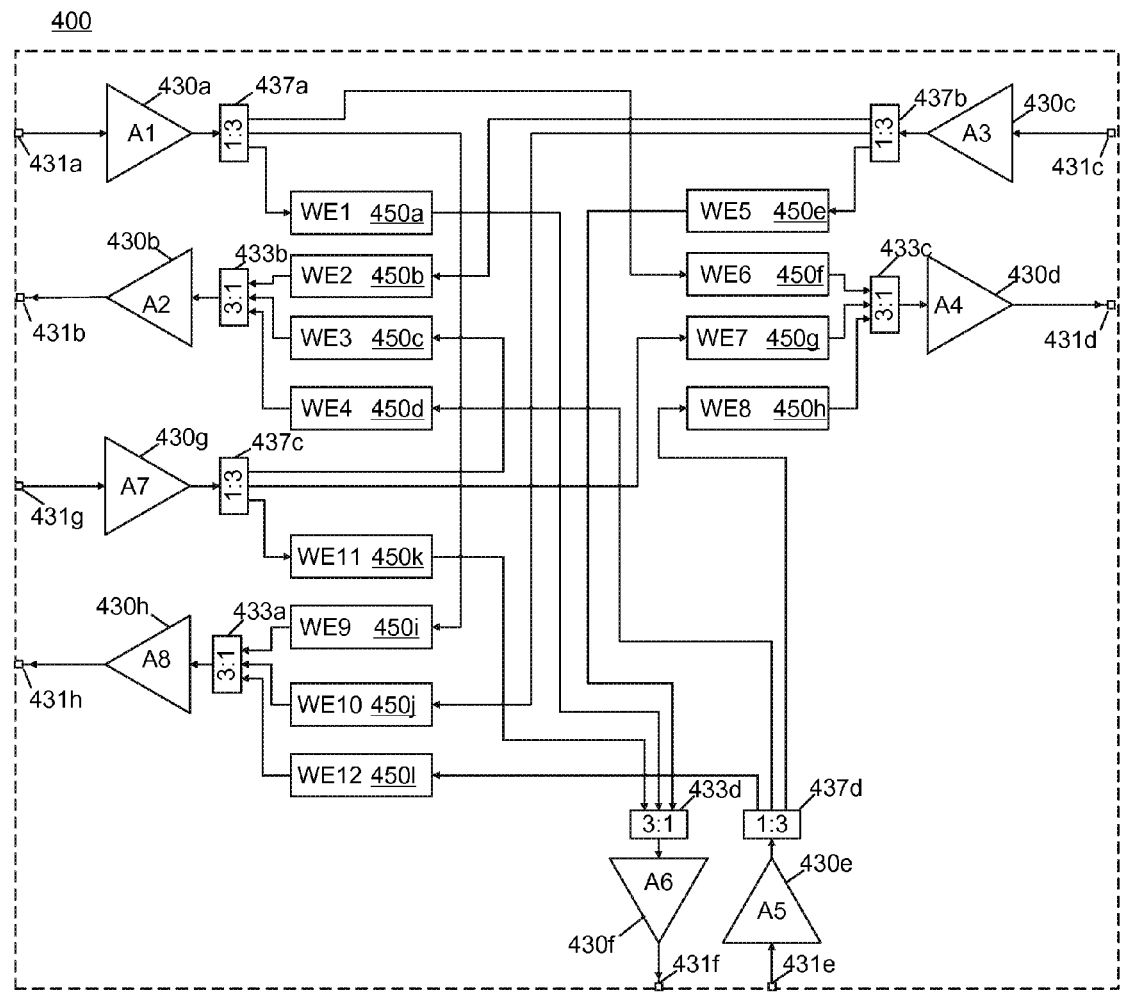
FIG. 4 is an illustration of an optical signal processor that can be used to create a three degree optical node.

FIG. 4 shows an optical signal processor (OSP) 400 consisting of eight optical amplifiers 430a-h, and twelve wavelength equalizers 450a-l that may be contained within a single wavelength equalizing array 300. The wavelength equalizing array is a wavelength processing device. A wavelength processing device is defined as any optical device that optically operates on individual wavelengths of a WDM signal. For example, wavelength equalizing array is able to attenuate and block individual wavelengths within a plurality of WDM signals. The optical signal processor 400 receives four WDM signals; one from each of the four interfaces 431a, 431c, 431e, and 431g. These four signals are then amplified by optical amplifiers 430a, 430c, 430e, and 430g. Following amplification, each of the four signals is broadcasted to three different wavelength equalizers 450a-l using 1:3 couplers 437a-d. The wavelength equalizers 450a-l can be configured to attenuate each individual wavelength by some programmable amount. Alternatively each of the wavelength equalizers 450a-l can be configured to substantially block the individual wavelengths that pass through it. After passing through the wavelength equalizers, WDM signals are combined into groups of three using optical couplers 433a-d. The combined WDM signals are then amplified using optical amplifiers 430b, 430d, 430f, and 430h, before being outputted to optical interfaces 431b, 431d, 431f, and 431h.

The optical signal processor (OSP) 400 can be used to construct a three or four degree WDM optical node. If the optical circuitry associated with the optical signal processor 400 is wholly placed on a single circuit pack, the circuit pack would contain a fully integrated three or four degree ROADM. The ROADM circuit pack could serve as a four degree ROADM with no add/drop ports by using each input/output port pair 431a-b, 431c-d, 431e-f, and 431g-h as an optical degree. Alternatively, if combined with some form of wavelength multiplexing/demultiplexing circuitry, the ROADM circuit pack could serve as a three degree ROADM. For this case, input/output interface 431e-f may serve as the port used to interface to the wavelength multiplexing/demultiplexing circuitry. In order to complete the three degree node, optical transponders would be attached to add and drop ports of the wavelength multiplexing/demultiplexing circuitry.

Alternatively, any of the other three input/output interfaces 431a-b, 431c-d, 431g-h may serve as the interface to the wavelength multiplexing/demultiplexing circuitry, as each input/output interface is identical with respect to the function of and interconnection to all other input/output interfaces.

When operating as a three or four degree ROADM, the wavelength equalizers are programmed to pass and/or block wavelengths in order to pass or block wavelengths between input/output port pairs. For example, a wavelength arriving at input port 431a could be passed to output port 431d by programming wavelength equalizer 450f to pass the wavelength. In a similar manner, a wavelength arriving at input port 431g could be blocked from output port 431b by programming wavelength equalizer 450c to block the wavelength.

If a circuit pack containing wavelength multiplexing/demultiplexing circuitry is attached to input/output interface 431e-f, then that circuit pack is able to add and drop wavelengths to and from any of the three other input/output interfaces (431a-b, 431c-d, and 431g-h). Because of this functionality, it can be said that input/output interface 431e-f provides directionless add/drop ports for the other three interfaces (i.e., the add/drop ports are not dedicated to a sole degree direction).

Figure 5A:
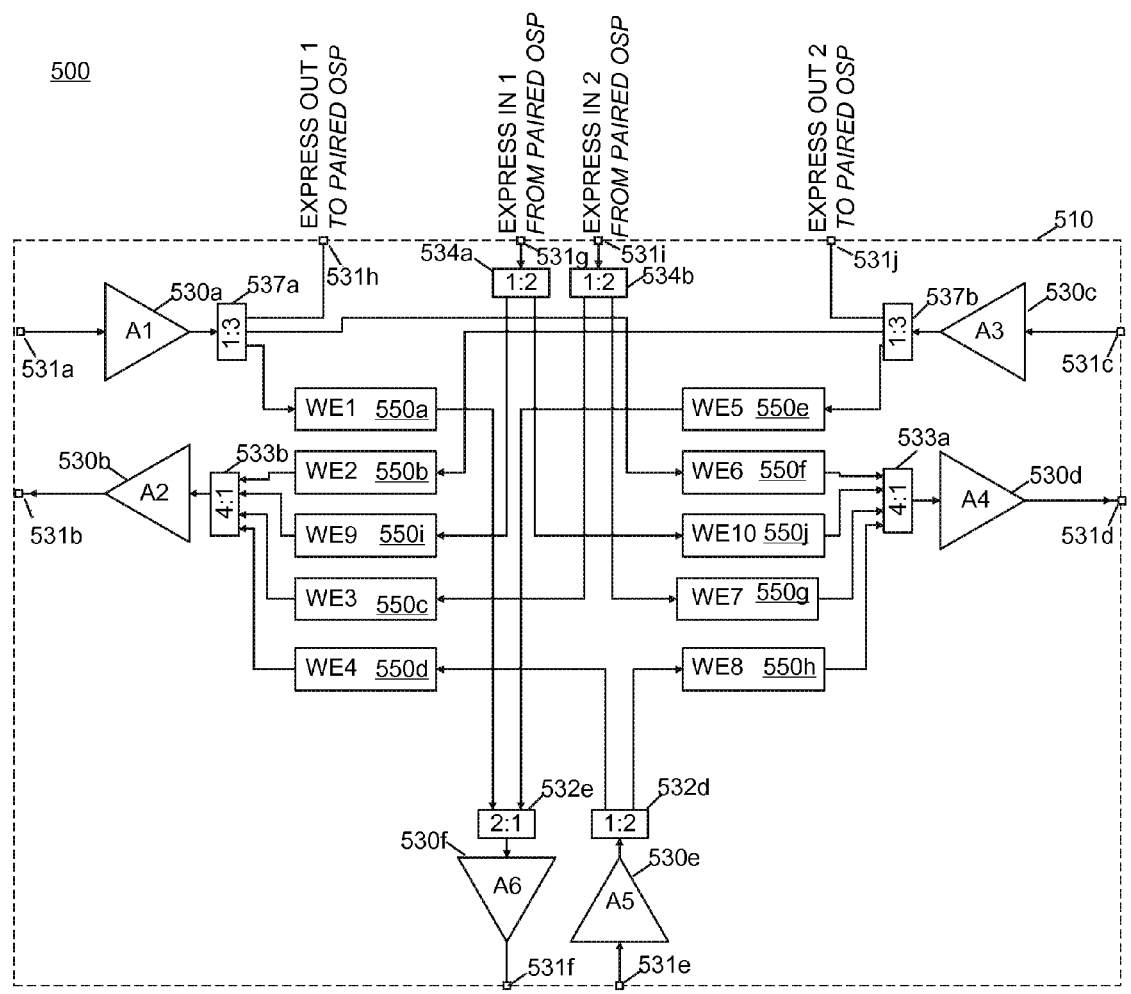
FIG. 5A is an illustration of an optical signal processor that can be used to create a four degree optical node.
Figure 5B:
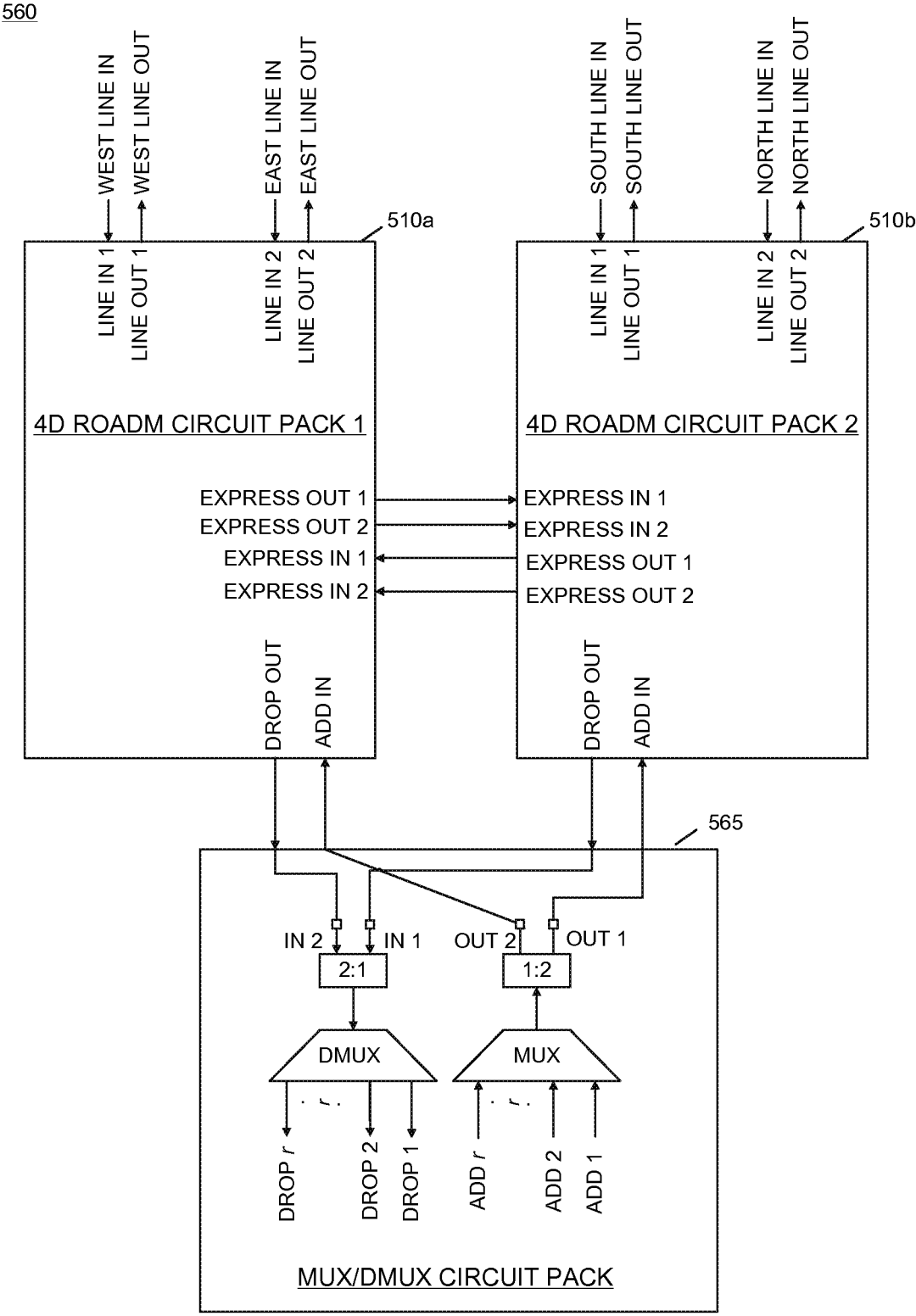
FIG. 5B is an illustration of how a single multiplexing/de-multiplexing circuit pack can be attached to two four degree ROADM circuit packs.

FIG. 5 shows an optical signal processor (OSP) 510 consisting of six optical amplifiers 530a-f, and ten wavelength equalizers 550a-h that may be contained within a single wavelength equalizing array 200. The wavelength equalizing array is a wavelength processing device. A wavelength processing device is defined as any optical device that optically operates on individual wavelengths of a WDM signal. The optical signal processor 510 receives three WDM signals; one from each of the three interfaces 531a, 531*c*, and 531*e*. These three signals are then amplified by optical amplifiers 530*a*, 530*c*, and 530*e*. Following amplification, each of the three signals is broadcasted to two different wavelength equalizers 550*a*/550*f*, 550*b*/550*e*, and 550*d*/550*h* using couplers 537*a*, 537*b*, and 532*d*. In addition, the WDM signals on interfaces 531*a* and 531*c* are broadcasted to the interfaces 531*h* and 531*j* respectively. Also, the WDM signals on input interfaces 531*g* and 531*i* are broadcasted to wavelength equalizers 550*i*/550*j* and 550*c*/550*g* respectively using couplers 534*a* and 534*b*. The wavelength equalizers 550*a-h* can be configured to attenuate each individual wavelength by some programmable amount. Alternatively each of the wavelength equalizers 550*a-h* can be configured to substantially block the individual wavelengths that pass through it. After passing through the wavelength equalizers, WDM signals are combined into two groups of four using optical couplers 533*a-b*, and one group of two using optical coupler 532*e*. The combined WDM signals are then amplified using optical amplifiers 530*b*, 530*d*, and 530*f*, before being outputted to optical interfaces 531*b*, 531*d*, and 531*f*.

Figure 5C:
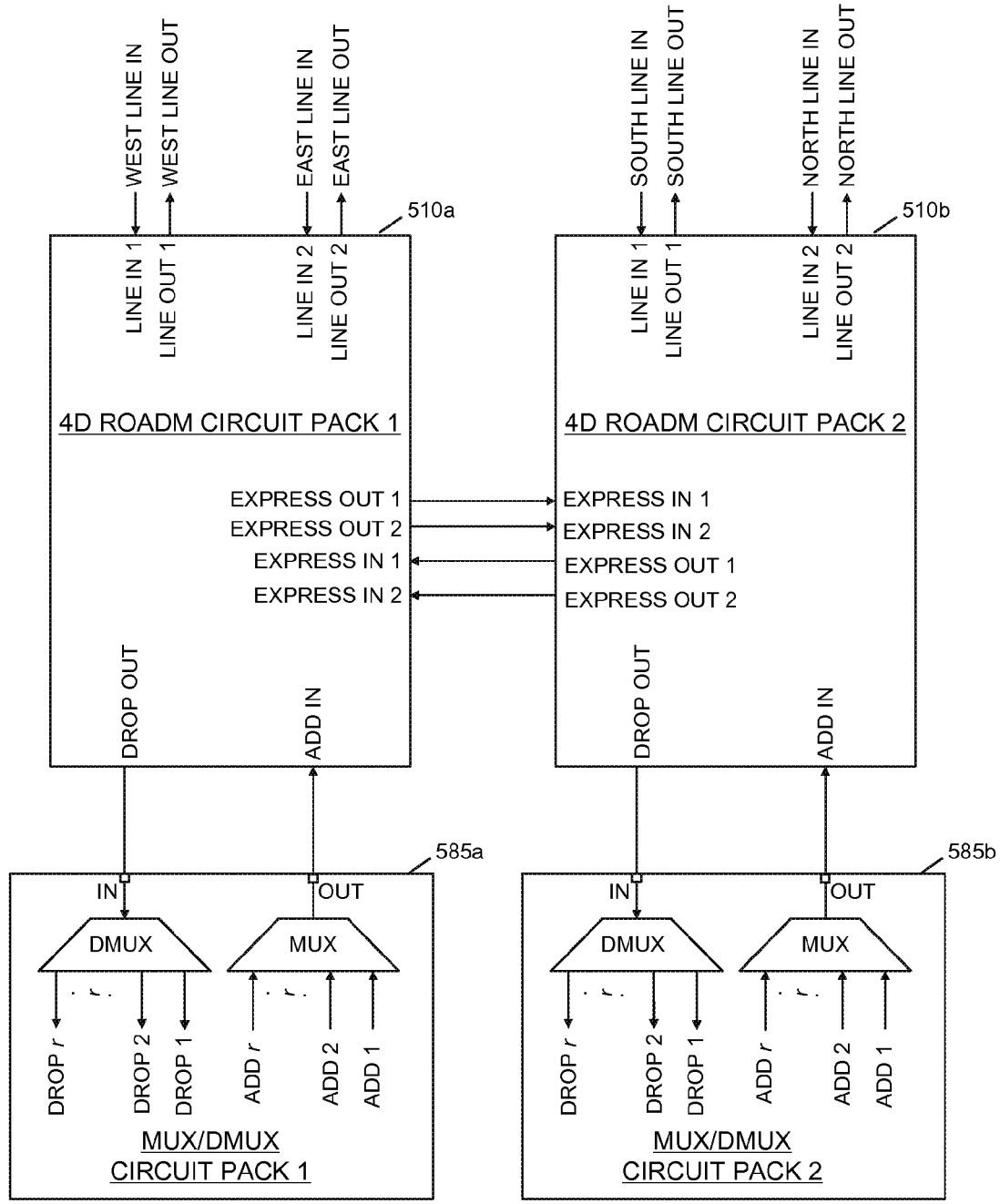
FIG. 5C is an illustration of how a two multiplexing/de-multiplexing circuit packs can be attached to two four degree ROADM circuit packs.

The optical signal processor (OSP) 510 can be used to construct a two or four degree WDM optical node. If the optical circuitry associated with the optical signal processor 510 is wholly placed on a single circuit pack, the circuit pack would contain a fully integrated two degree ROADM that can be expanded to support a four degree node if two such ROADMs are paired. If combined with some form of wavelength multiplexing/demultiplexing circuitry, the ROADM circuit pack could serve as a two degree ROADM. For this case, input/output interface 531*e-f* may serve as the port used to interface to the wavelength multiplexing/demultiplexing circuitry. In order to complete the two degree node, optical transponders would be attached to add and drop ports of the wavelength multiplexing/demultiplexing circuitry. If two of the ROADM circuit packs are paired, by optically connecting Express Out 1 and Express Out 2 on the first ROADM circuit pack to Express In 1 and Express In 2 on the second ROADM circuit pack, and vice versa, a four degree node is formed. For the four degree case, either a single set of multiplexing/demultiplexing circuitry 565 could be shared between the two ROADM circuit packs 560 (FIG. 5B), or each ROADM circuit pack could have its own dedicated multiplexing/demultiplexing circuitry 580 (FIG. 5C). In four degree node 560 and node 580, ports Line In 1 and Line Out 1 may be interfaces 531*a* and 531*b* respectively, and ports Line In 2 and Line Out 2 may be interfaces 531*c* and 531*d* respectively, while the ports Add In and Drop Out may be the interfaces 531*e* and 531*f* respectively. In 560, all the add/drop interfaces are able to send and receive from any of the four line interfaces, and therefore are considered directionless add/drop ports. In 580, the add/drop ports can only send and receive wavelengths to and from the two line interfaces that are associated with the ROADM circuit pack that they are attached to, and therefore, the add/drop ports are said to be partially directionless add/drop ports.

If in 580 the ROADM circuit pack 510*a* is used in a two degree node application without a paired ROADM 510*b*, then the add/drop ports of the multiplexing/demultiplexing circuit pack 585*a* are (fully) directionless with respect to the two degree node. The wavelength equalizing array on the ROADM circuit pack 510*a* is used to both select wavelengths for each degree, and to perform directionless steering for the add/drop ports of each degree.

When operating as a two or four degree ROADM, the wavelength equalizers are programmed to pass and/or block wavelengths in order to pass or block wavelengths between input/output port pairs. For example, a wavelength arriving at input port 531*a* could be passed to output port 431*d* by programming wavelength equalizer 550*f* to pass the wavelength. In a similar manner, a wavelength arriving at input port 531*c* could be blocked from output port 531*b* by programming wavelength equalizer 550*b* to block the wavelength.

In order to either limit the number of supported circuit packs or in order to simplify the manufacturing process, field configurable or field programmable photonics can be introduced.

Figure 6:
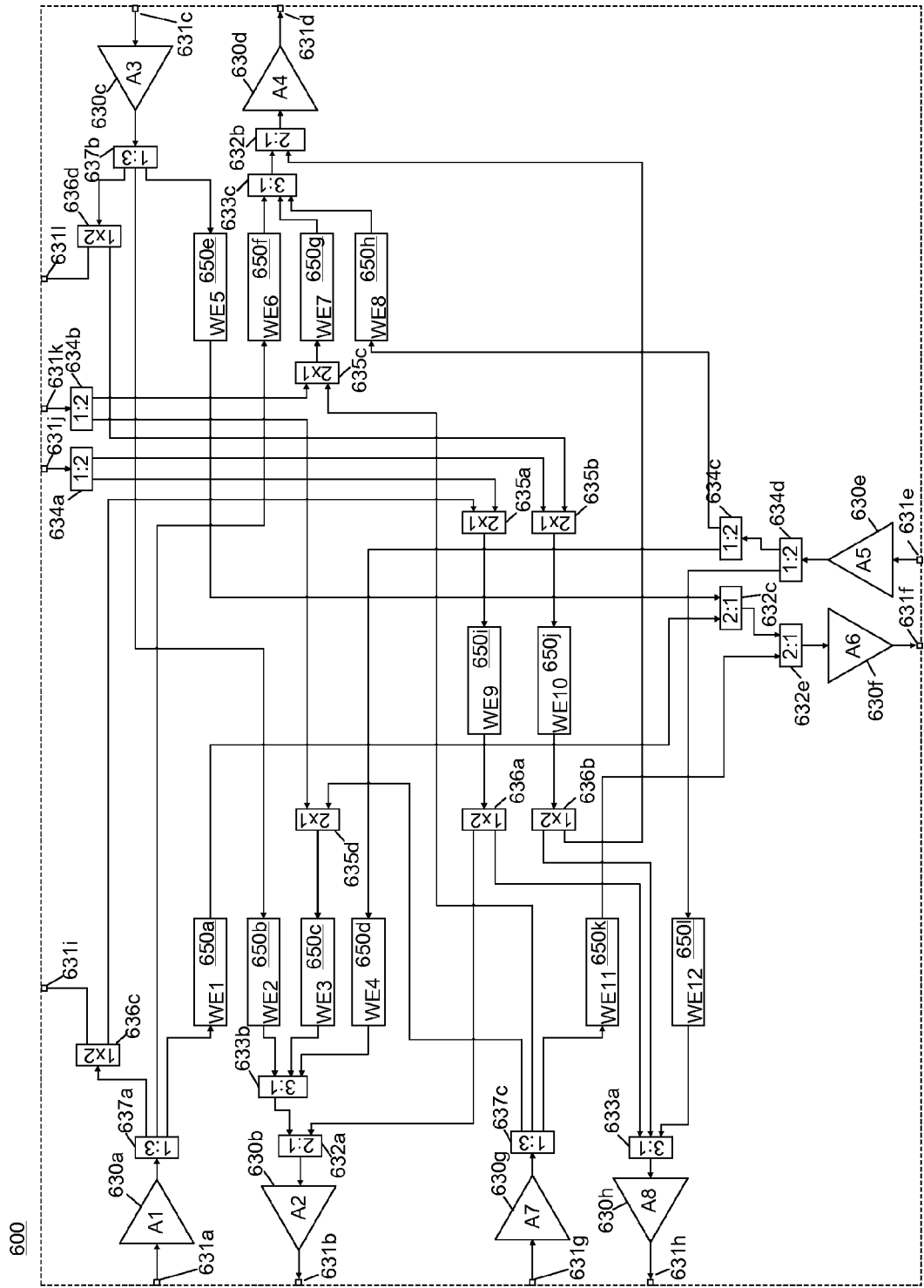
FIG. 6 is an illustration of an optical signal processor that can be used to create a three or four degree optical node.

FIG. 6 shows an optical signal processor 600 that can perform the function of either optical signal processor 400 or optical signal processor 510. The dual functionality is enabled by the use of a set of 1 by 2 (636*a-d*) and 2 by 1 (635*a-d*) optical switches. In addition, some of the optical couplers may ideally be replaced with variable coupling ratio optical couplers (i.e., variable optical couplers). A common wavelength equalizing array containing twelve wavelength equalizers 300 could be used in both application, or if the optical signal processor is customized during manufacturing, two different wavelength equalizing arrays could be used—with both arrays having a common optical interface (perhaps an MTP connector with 24 fibers). An optical amplifier array containing eight amplifiers could be used to support both optical signal processor 400 and 510. Alternatively, if the optical signal processor is customized during manufacturing, two different wavelength optical amplifier arrays could be used, or a plurality of discrete pluggable amplifier sets could be used (one set for each pair of input/output amplifiers). Yet another alternative would be to place the optical signal processor 600 on a circuit pack with a front panel that contained slots to populate pairs of input/output amplifiers. This would easily allow an end user to populate the amplifier pair 630*g-h* only when operating the optical signal processor as a three degree ROADM. This arrangement would also allow an end user to populate input amplifiers 630*a*, 630*c*, and 630*g* with different gain ranges in order to more efficiently accommodate optical spans of varying length.

In the optical signal processor 600, the three degree function 400 can be programmed by programming optical switch 636*c* to direct its light to optical switch 635*a*, programming optical switch 636*d* to direct its light to optical switch 635*b*, programming optical switches 636*a* and 636*b* to direct their light to optical coupler 633*a*, programming optical switches 635*c* and 635*d* to receive their light from optical coupler 637*c*, programming optical switch 635*a* to receive its light from optical coupler 636*c*, and programming optical switch 635*b* to receive its light from optical coupler 636*d*. In addition, ideally, optical couplers 632*a* and 632*b* should be variable optical couplers wherein in the 400 application all the light exiting them should be directed from optical couplers 633*b* and 633*c* respectively. In addition, ideally, optical coupler 632*a* and 632*b* should be variable optical couplers wherein in the 510 application one quarter (¼) of the light exiting couplers 632*a* and 632*b* respectively should come from optical switches 636*a* and 636*b* respectively. Using other variable optical couplers in place of fixed coupling ratio optical couplers may also further optimize the application for the lowest insertion losses through various optical paths.

In optical signal processor 600, the four degree function 510 can be programmed by programming optical switch 636*c* to direct its light to optical interface 631*i*, programming optical switch 636*d* to direct its light to optical interface 631*l*, programming optical switches 636*a* and 636*b* to direct their light to optical couplers 632*a* and 632*b* respectively, programming optical switches 635*c* and 635*d* to receive their light from optical coupler 634*b*, and programming optical switches 635*a* and 635*b* to receive their light from optical coupler 634*a*. Using other variable optical couplers in place of fixed coupling ratio optical couplers may also further optimize the application for the lowest insertion losses through various optical paths.

From the diagram in FIG. 6, it can be seen that wavelength equalizers 650*k* and 650*l* are used only for the 400 application, and in addition optical amplifiers 630*g* and 630*h*—and their associated external interfaces 631*g* and 631*h*—are used only for the 400 application. Lastly, external interfaces 631*i*, 631*j*, 631*k*, and 631*l* are only used for the 510 application.

Figure 7:
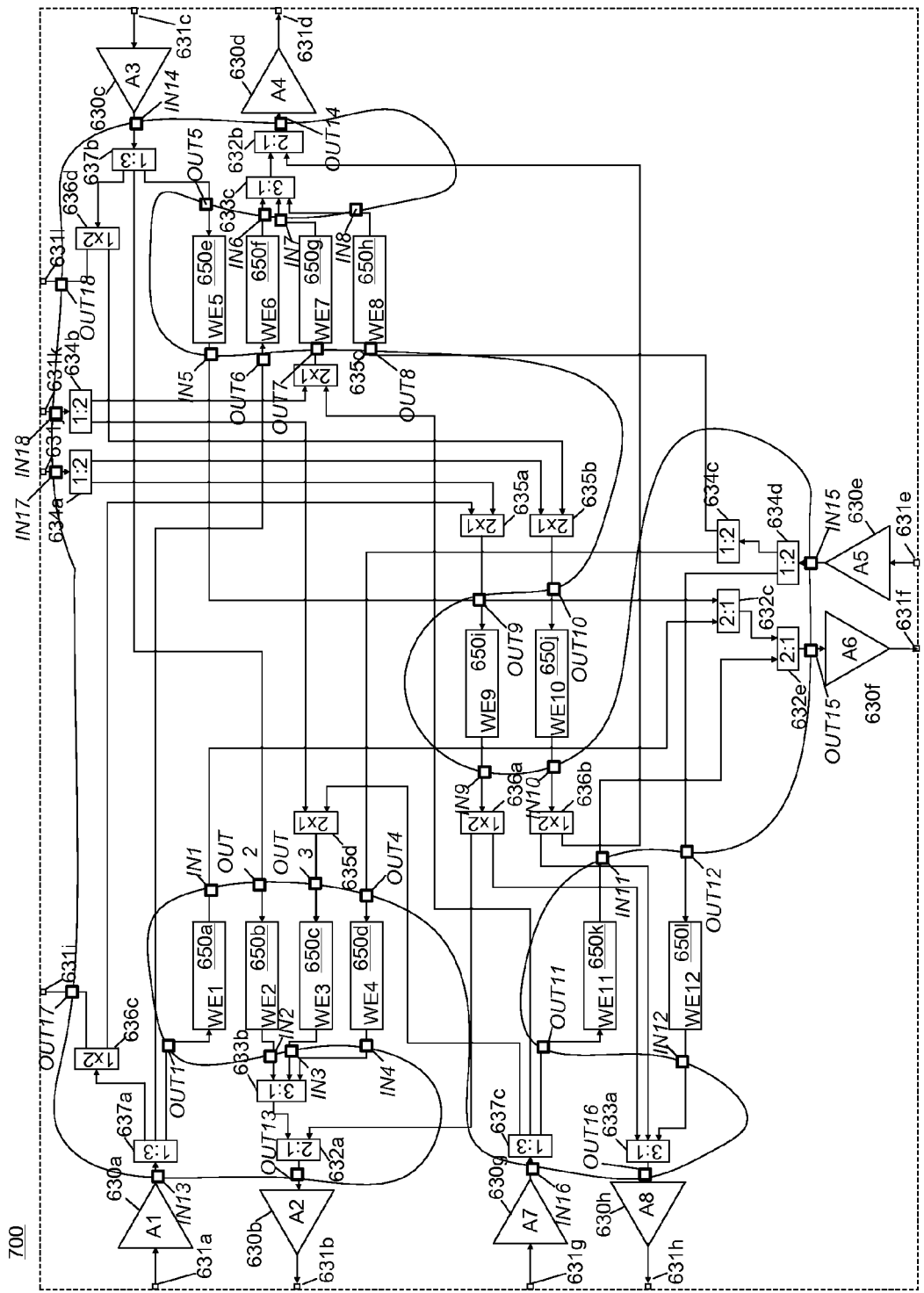
FIG. 7 is a detailed illustration of an optical signal processor that can be used to create a three or four degree optical node, with field programmable photonics.

FIG. 7 illustrates the optical elements of 600 that would be placed in a field programmable photonic device. As can be seen in 700, the elements that would be placed in the field programmable photonic device have been circled, and only the optical amplifiers and wavelength equalizers are placed outside of the field programmable photonic device. Additionally PLC based wavelength equalizers may be placed within the field programmable photonic device if this makes economic sense in the future. The inputs and outputs of the field programmable photonic device have been labeled as INi and OUTi in FIG. 7. As can be seen, there are 18 optical inputs to the FPP device, and 18 optical outputs.

Figure 8:
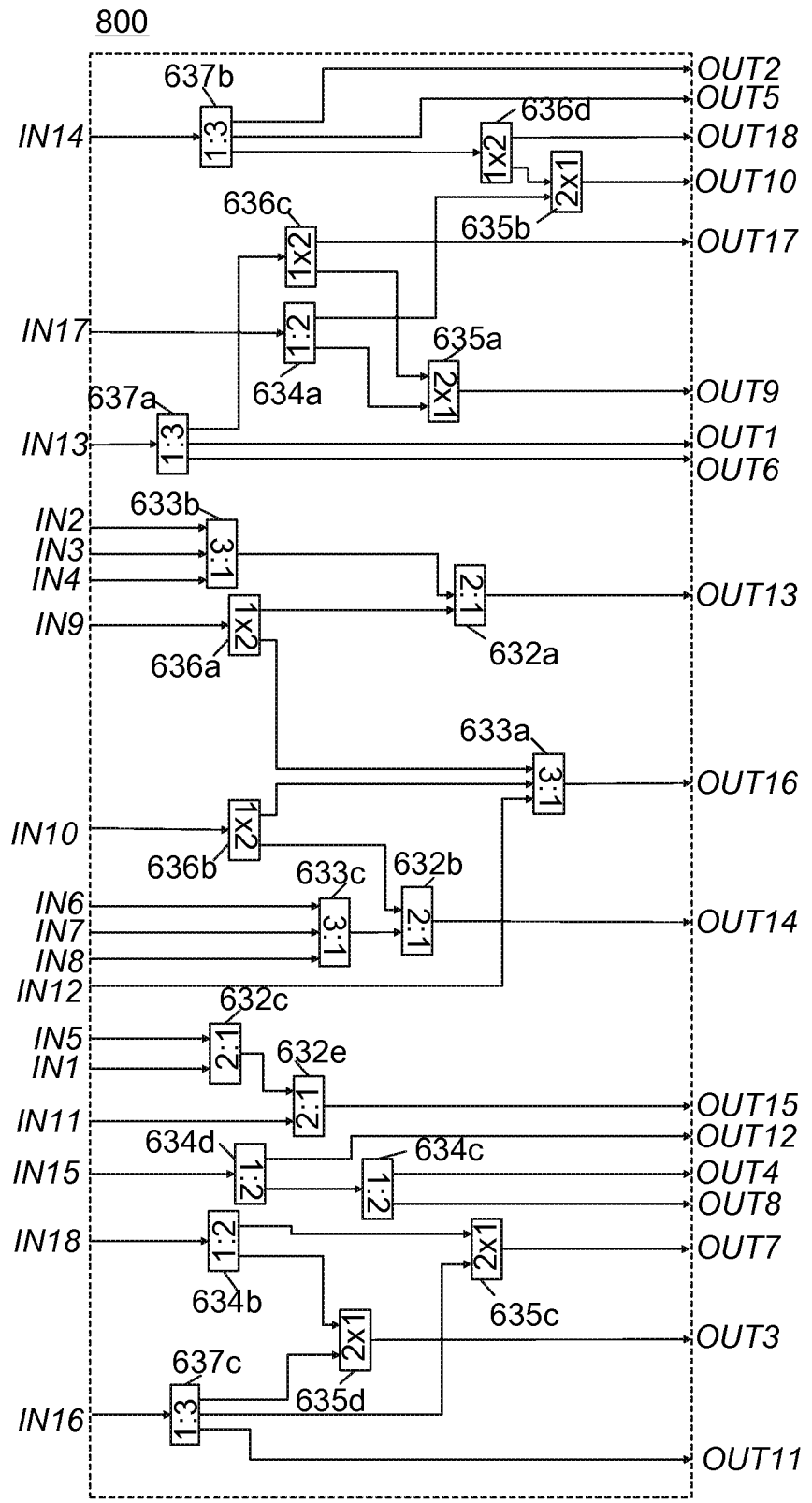
FIG. 8 is a detailed look inside of a field programmable photonic device.

FIG. 8 shows the field programmable photonic elements of 700 grouped together into one field programmable photonic (FPP) device 800, wherein the entry and exit labels INi and OUTi in 800 correspond to the labels INi and OUTi of the entry and exit points of the FPP in 700. As can be seen, the field programmable photonic device 800 is comprised of a plurality of optical coupler devices whose interconnection to the input and output ports of the device is done using optical switches. Additionally (not shown), optical switches could be used to interconnect one or more optical couplers together within the field programmable photonic device, in order to add additional functionality. The optical couplers and optical switches in 800 may be integrated together on a common substrate in order to enable the mass manufacture of the field programmable photonic device.

Figure 9:
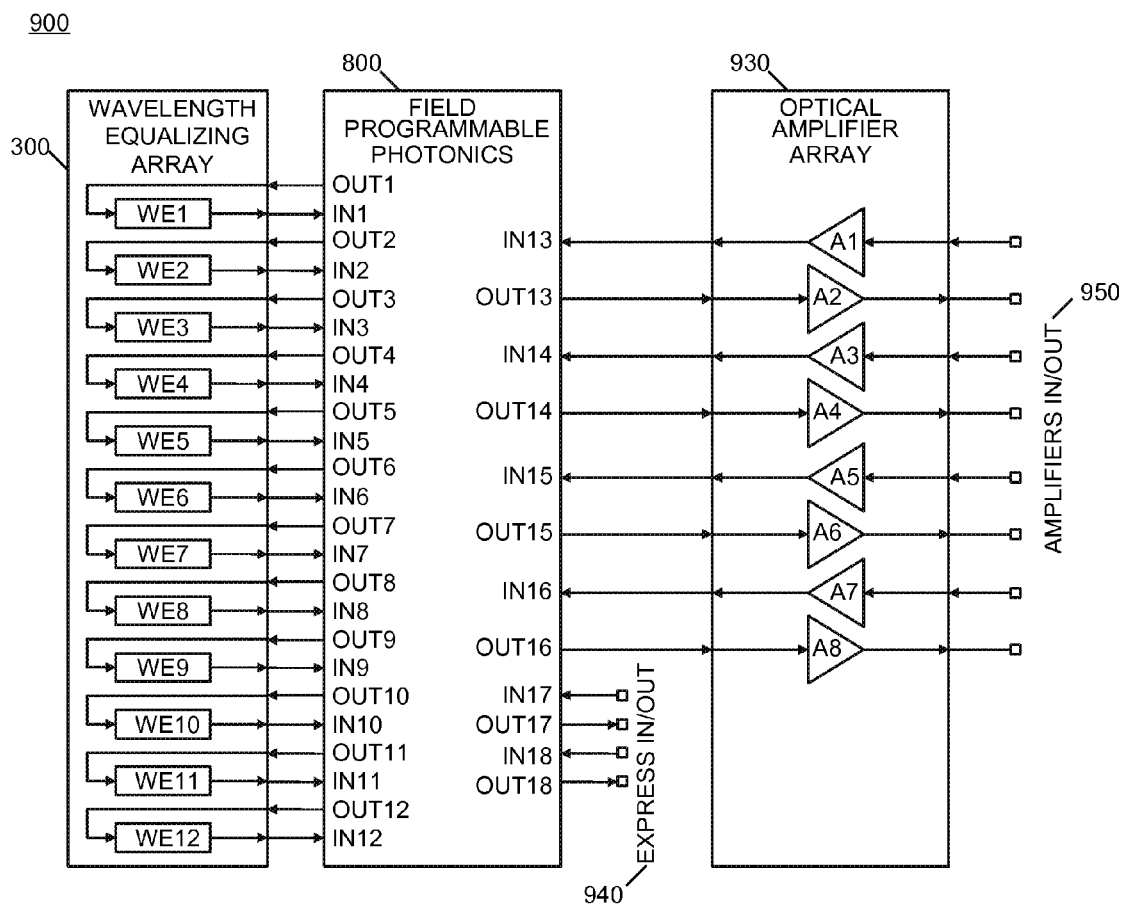
FIG. 9 is a high level diagram showing the three optical building blocks of an optical signal processor that can be used to create a three or four degree optical node.

FIG. 9 is a high level diagram showing the three optical building blocks of an optical signal processor that can be used to create a three or four degree optical node. Interconnection between the three major components may most easily be done by using parallel fiber optic cables with MTP optical connectors. The wavelength equalizing array 300 may be substantially the same as the wavelength equalizing array 300 discussed in reference to FIG. 3. The field programmable photonic device 800 may be substantially the same as the field programmable photonic device 800 discussed in reference to FIG. 8.

Based upon the previous embodiments, it is clear that the wavelength equalizing array becomes a common building block that can be paired with field programmable optics to build optical signal processors with any number of functions—limited only by the complexity of the field programmable photonics. For instance, in addition to the two, three, and four degree integrated ROADM products that can be built with the described field programmable photonics, additional optical circuitry could be added to the FPP that would provide for some number of colorless optical add/drop ports for a non-expandable two degree ROADM.

Figure 10A:
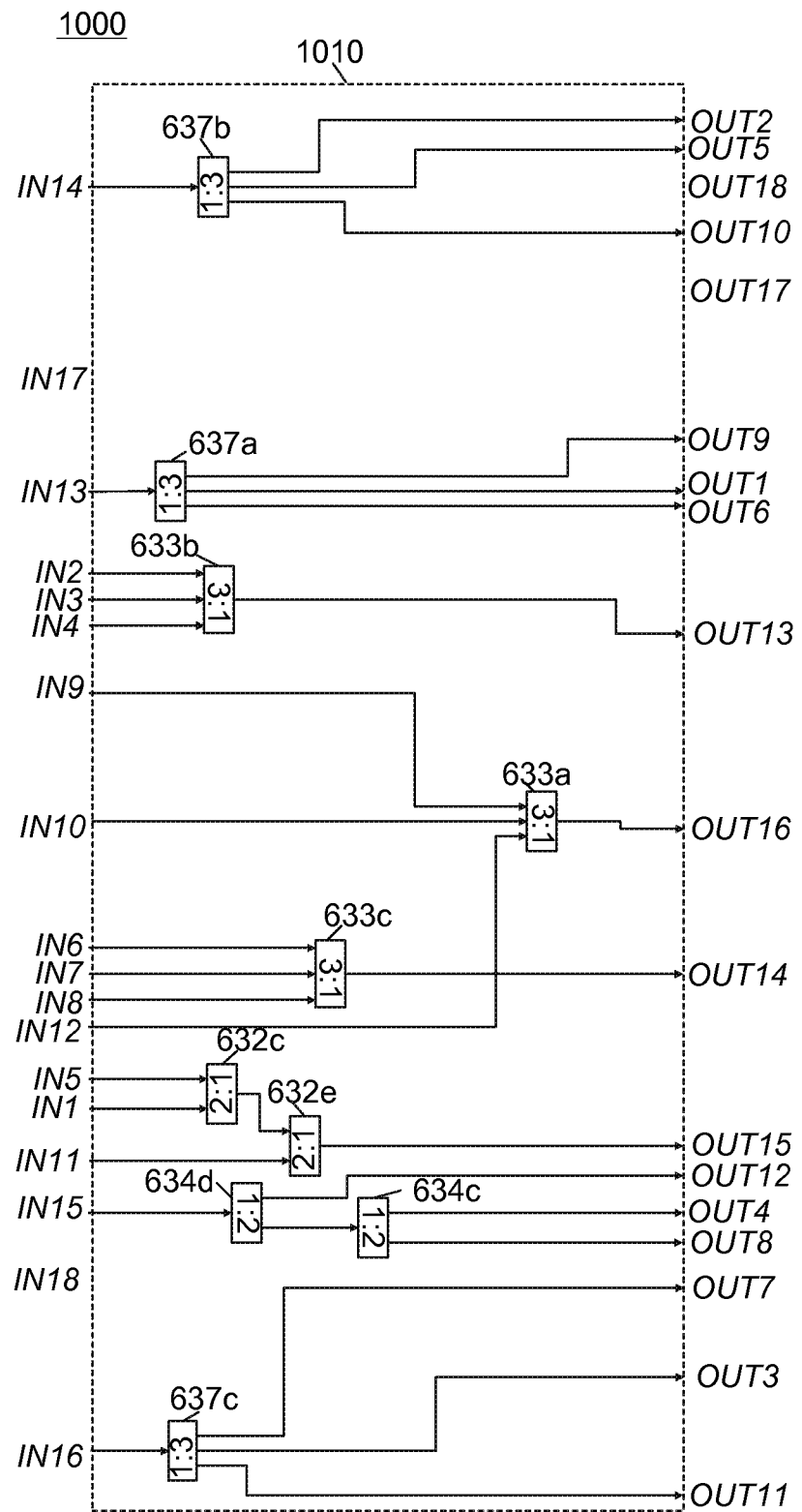
FIG. 10A is a detailed look inside of an application specific photonic device that can be used to construct a three degree optical node.
Figure 10B:
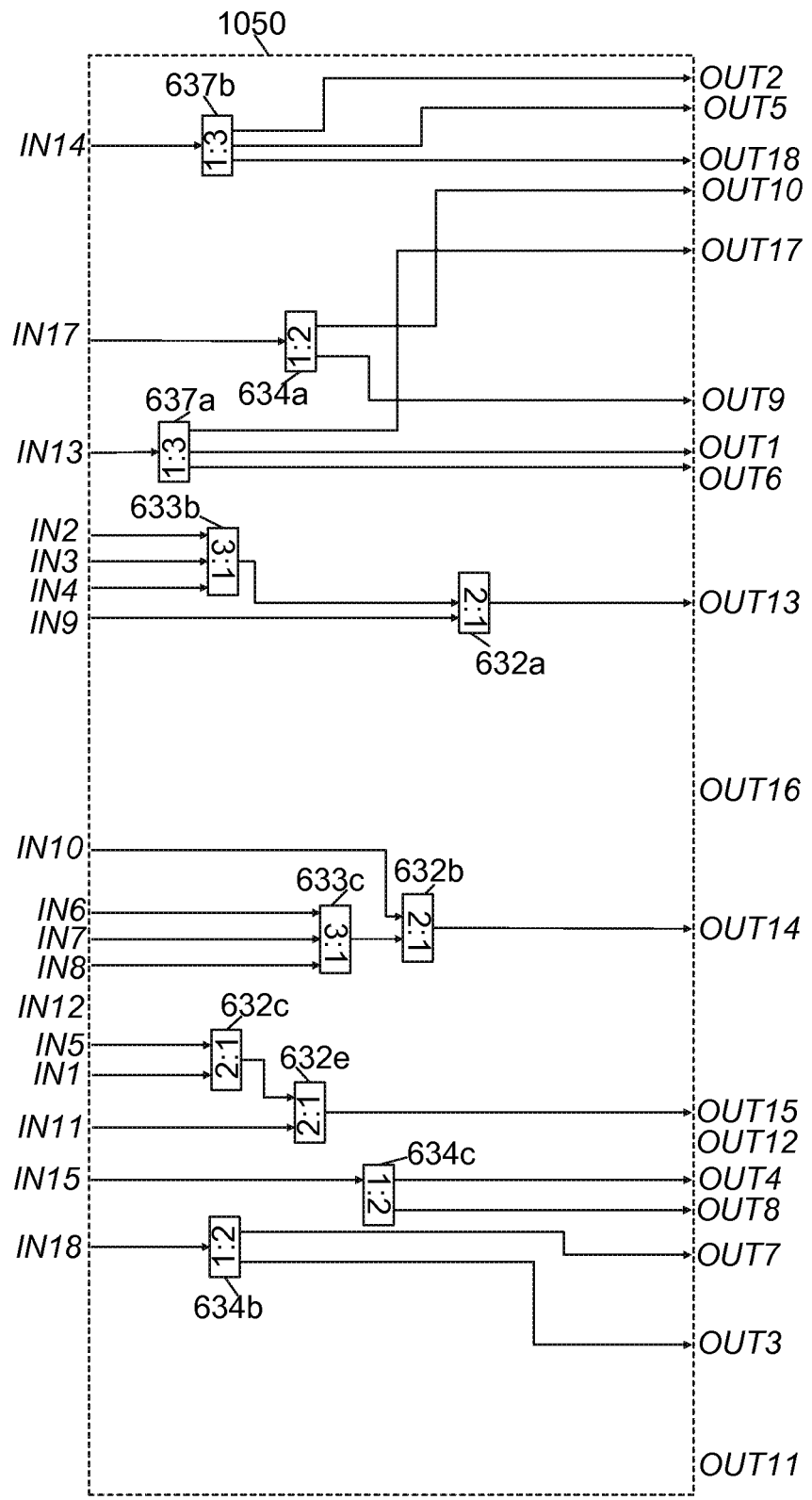
FIG. 10B is a detailed look inside of an application specific photonic device that can be used to construct a four degree optical node.

As an alternative to using a single field programmable photonic device 800, multiple Application Specific Photonic (ASP) devices may be used to create optical signal processors with differing capabilities. The Application Specific Photonic devices may have substantially the same physical form factor, electrical connectors, and optical connectors, in order to allow one to easily swap between different single-application photonic devices when configuring the optical signal processor for various applications. For instance, FIG. 10A and FIG. 10B show two Application Specific Photonic devices 1010, 1050 which could be used in place of the field programmable photonic device 800 on optical signal processor 900 in FIG. 9.

Application Specific Photonic device 1010 is used to implement the optical signal processor 400, while Application Specific Photonic device 1050 is used to implement the optical signal processor 510.

As can be seen, the application specific photonic devices 1010 and 1050 are comprised of a plurality of optical coupler devices. Additionally (not shown), other fixed and programmable optical devices could be contained within the application specific photonic devices in order to provide additional functionality. The optical couplers (and optionally other fixed and programmable optical devices) in 1010 and 1050 may be integrated together on a common substrate in order to enable the mass manufacture of the application specific photonic device.

A method of constructing an optical signal processor may consist of utilizing at least one wavelength processing device to operate on individual wavelengths, a plurality of optical amplifying devices to amplify groups of wavelengths, and a field programmable photonic device to allow the optical signal processor and to perform multiple networking applications.

A method of constructing multi-degree optical nodes may consist of utilizing at least one wavelength processing device to operate on individual wavelengths, a plurality of optical amplifying devices to amplify groups of wavelengths, and a field programmable photonic device that allows nodes of differing capabilities to be constructed.

What is claimed is:

1. An optical signal processor comprising:
a field programmable photonic device comprising a plurality of optical switches, each having at least one optical output and a first optical input and at least a second optical input, and used to direct a first wavelength division multiplexed signal from the first optical input to the at least one optical output when programmed for a first function, and used to direct a second wavelength division multiplexed signal from the at least a second optical input to the at least one optical output when programmed for a second function;
a first wavelength equalizer, having only one optical input and only one optical output, and used to pass and block individual wavelengths from a first optical degree to a second optical degree when the plurality of optical switches are programmed for the first function and the second function;
a second wavelength equalizer, having only one optical input and only one optical output, and used to pass and block individual wavelengths from the second optical degree to the first optical degree when the plurality of optical switches are programmed for the first function and the second function;
a third wavelength equalizer, having only one optical input and only one optical output, and used to pass and block individual wavelengths from a third optical degree to the first optical degree when the plurality of optical switches are programmed for the first function, and used to pass and block individual wavelengths from an express interface to the first optical degree when the plurality of optical switches are programmed for the second function; and a fourth wavelength equalizer, having only one optical input and only one optical output, and used to pass and block individual wavelengths from the third optical degree to the second optical degree when the plurality of optical switches are programmed for the first function, and used to pass and block individual wavelengths from the express interface to the second optical degree when the plurality of optical switches are programmed for the second function.

2. The optical signal processor of claim 1, wherein the field programmable photonic device further comprises a second plurality of optical switches, each having at least one optical input and a first optical output and at least a second optical output, and used to direct an inputted wavelength division multiplexed signal from the at least one optical input to the first optical output when programmed for the first function, and used to direct the inputted wavelength division multiplexed signal from the at least one optical input to the at least a second optical output when programmed for the second function.

3. The optical signal processor of claim 2, wherein when programmed for the first function a first optical switch of the second plurality of optical switches directs its inputted wavelength division multiplexed signal from a fifth wavelength equalizer to the third optical degree, and a second optical switch of the second plurality of optical switches directs its inputted wavelength division multiplexed signal from a sixth wavelength equalizer to the third optical degree, and wherein when programmed for the second function the first optical switch of the second plurality of optical switches directs its inputted wavelength division multiplexed signal from the fifth wavelength equalizer to the first optical degree, and the second optical switch of the second plurality of optical switches directs its inputted wavelength division multiplexed signal from the sixth wavelength equalizer to the second optical degree.

4. The optical signal processor of claim 2, wherein when programmed for the second function, a first optical switch of the second plurality of optical switches directs its inputted wavelength division multiplexed signal to the express interface, and wherein when programmed for the first function, the first optical switch of the second plurality of optical switches directs its inputted wavelength division multiplexed signal away from the express interface.

5. The optical signal processor of claim 1, further comprising a fifth wavelength equalizer, having only one optical input and only one optical output, and used to pass and block individual wavelengths, wherein when programmed for the first function a first optical switch of the plurality of optical switches directs a first inputted wavelength division multiplexed signal from the first optical degree to the fifth wavelength equalizer, and wherein when programmed for the second function the first optical switch of the plurality of optical switches directs a second inputted wavelength division multiplexed signal from a second express interface to the fifth wavelength equalizer.

6. The optical signal processor of claim 5, further comprising a sixth wavelength equalizer, having only one optical input and only one optical output, and used to pass and block individual wavelengths, wherein when programmed for the first function a second optical switch of the plurality of optical switches directs an inputted wavelength division multiplexed signal from the second optical degree to the sixth wavelength equalizer, and wherein when programmed for the second function the second optical switch of the plurality of optical switches directs another inputted wavelength division multiplexed signal from the second express interface to the sixth wavelength equalizer.

7. The optical signal processor of claim 1, further comprising a wavelength equalizing array comprising the first wavelength equalizer, the second wavelength equalizer, the third wavelength equalizer and the fourth wavelength equalizer.

8. An optical signal processor comprising:
a plurality of optical inputs;
a plurality of optical outputs;
a plurality of wavelength equalizers each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer; and
a field programmable photonic device residing external to the plurality of wavelength equalizers and comprising: a first plurality of optical switches, each having at least one optical output and a first optical input and at least a second optical input, and used to switch a first wavelength division multiplexed signal from the first optical input to the at least one optical output when programmed for a first function, and used to switch a second wavelength division multiplexed signal from the at least a second optical input to the at least one optical output when programmed for a second function, and a second plurality of optical switches each having at least one optical input and a first optical output and at least a second optical output, and used to switch a wavelength division multiplexed signal from the at least one optical input to the first optical output when programmed for the first function, and used to switch the wavelength division multiplexed signal from the at least one optical input to the at least a second optical output when programmed for the second function,
wherein the first plurality of optical switches are used to switch wavelength division multiplexed signals from the plurality of optical inputs to the plurality of wavelength equalizers, and wherein the second plurality of optical switches are used to switch wavelength division multiplexed signals from the plurality of wavelength equalizers to the plurality of optical outputs.

9. The optical signal processor of claim 8, wherein the plurality of wavelength equalizers are used to pass and block individual wavelengths within wavelength division multiplexed signals from the first plurality of optical switches.

10. The optical signal processor of claim 8, further comprising at least one optical coupler, used to optically combine wavelength division multiplexed signals from at least two wavelength equalizers of the plurality of wavelength equalizers.

* * * * *